(12) United States Patent
Seo (10) Patent No.: US 9,311,000 B2
(45) Date of Patent: Apr. 12, 2016

(54) METHOD FOR DISPLAYING KEYPAD FOR SMART DEVICES

(71) Applicant: Joo Hong Seo, Seoul (KR)

(72) Inventor: Joo Hong Seo, Seoul (KR)

( * ) Notice: Subject to any disclaimer, the term of this patent is extended or adjusted under 35 U.S.C. 154(b) by 0 days.

(21) Appl. No.: 14/390,934

(22) PCT Filed: Apr. 4, 2013

(86) PCT No.: PCT/KR2013/002816
§ 371 (c)(1),
(2) Date: Oct. 6, 2014

(87) PCT Pub. No.: WO2013/151354
PCT Pub. Date: Oct. 10, 2013

(65) Prior Publication Data
US 2015/0067573 A1 Mar. 5, 2015

(30) Foreign Application Priority Data

Apr. 4, 2012 (KR) .......................... 10-2012-0035143

(51) Int. Cl.
*G06F 3/0488* (2013.01)
*G06F 3/01* (2006.01)
*G06F 3/0484* (2013.01)
*G06F 3/0485* (2013.01)
*G06T 11/00* (2006.01)

(52) U.S. Cl.
CPC ............ *G06F 3/04886* (2013.01); *G06F 3/016* (2013.01); *G06F 3/0485* (2013.01); *G06F 3/04845* (2013.01); *G06T 11/001* (2013.01); *G06F 2203/04804* (2013.01)

(58) Field of Classification Search
CPC ... G06F 3/016; G06F 3/0488; G06F 3/04886; G06F 3/0481; G09G 2340/145
See application file for complete search history.

(56) References Cited

U.S. PATENT DOCUMENTS

| | | | | |
|---|---|---|---|---|
| 6,501,464 | B1 * | 12/2002 | Cobbley et al. | 345/173 |
| 8,013,837 | B1 * | 9/2011 | Schroeder | G06F 3/011 345/157 |
| 2001/0048428 | A1 * | 12/2001 | Ukita | G06F 1/1626 345/169 |
| 2004/0085348 | A1 * | 5/2004 | Wang | H04L 41/22 715/735 |
| 2005/0104855 | A1 * | 5/2005 | Grossmeyer | 345/169 |
| 2005/0227635 | A1 * | 10/2005 | Hawkins | G06F 1/1616 455/90.3 |
| 2007/0013662 | A1 * | 1/2007 | Fauth | 345/168 |
| 2008/0174564 | A1 * | 7/2008 | Kim | G06F 3/0488 345/173 |
| 2009/0007012 | A1 * | 1/2009 | Mandic | G06F 3/0481 715/810 |
| 2010/0146393 | A1 * | 6/2010 | Land et al. | 715/723 |
| 2011/0187650 | A1 * | 8/2011 | Lee | 345/170 |
| 2011/0214053 | A1 * | 9/2011 | Scott et al. | 715/259 |
| 2011/0248945 | A1 * | 10/2011 | Higashitani | 345/173 |
| 2011/0264010 | A1 * | 10/2011 | Williams | 600/595 |
| 2012/0117568 | A1 * | 5/2012 | Plotkin | 718/100 |
| 2012/0235912 | A1 * | 9/2012 | Laubach | G06F 3/04895 345/163 |
| 2012/0274565 | A1 * | 11/2012 | Moser | 345/168 |
| 2013/0002991 | A1 * | 1/2013 | Latella et al. | 349/77 |
| 2013/0234949 | A1 * | 9/2013 | Chornenky | G06F 3/0216 345/169 |
| 2013/0285927 | A1 * | 10/2013 | Pasquero | G06F 3/0237 345/173 |
| 2014/0144764 | A1 * | 5/2014 | Wilson | H01L 43/00 200/5 R |
| 2015/0109207 | A1 * | 4/2015 | Li | H04M 1/23 345/158 |

FOREIGN PATENT DOCUMENTS

| | | | |
|---|---|---|---|
| KR | 10-2010-0059299 A | | 6/2010 |
| KR | 10-2010-0096590 A | | 9/2010 |
| KR | 10-2010-0103275 A | | 9/2010 |
| KR | 10-2011-0129090 A | | 12/2011 |

* cited by examiner

Primary Examiner — Steven Sax
(74) Attorney, Agent, or Firm — Jefferson IP Law, LLP (57) ABSTRACT

According to a method for displaying a keypad for a smart device of the present invention, a keypad can be displayed in a transparent or a translucent state by being overlapped with an output window displayed on a display module of a smart device such that both of an input window and the output window can be used over a wide area, and the transparency or color of the keypad periodically changes such that a user can check the keypad position which is displayed instantaneously, thereby enabling precise input operations without having to memorize all of the keypad positions and solving problems such as the confusion caused by overlapping the output window with the transparent keypad.

10 Claims, 7 Drawing Sheets

METHOD FOR DISPLAYING KEYPAD FOR SMART DEVICES

TECHNICAL FIELD

The present invention relates, in general, to a method of displaying a keypad and, more particularly, to a method of displaying a keypad for a smart device in such a way that the transparency or color of the keypad changes periodically.

BACKGROUND ART

Electronic devices, such as conventional mobile phones, comprise, as discrete components, an input unit (e.g. a keypad) for inputting text and a display unit (e.g. an LCD) for displaying the input text. However, the recent miniaturization of electronic devices and advances in display modules (touch screens) have given birth to a new usage of touch screens in which a touch screen serves as either an output window or input window having a keypad implemented on the touch screen as needed, thus freeing the device from requiring a separate discrete input keypad.

A touch screen serving as either an input window or output window has a downside in that a user cannot see the output or other screen displays while entering characters. Therefore, other methods have been introduced, such as that of dividing the screen into several sections and displaying an input window and an output window at the same time according to the user's settings and that of displaying an input window (e.g. a virtual keypad) on the whole touch screen in such a way that the input window is overlapped in a translucent manner over other screen displays including outputs. However, the former method has a problem in that each window becomes too narrow, and the latter method has an issue in that the content of the keypad is not easily seen and confusion with the output displayed on the screen simultaneously may occur and cause inconvenience for the user.

To solve these problems, a new approach has been developed: displaying an input window in a translucent manner in such a way that the transparency of a frequently used key is gradually increased by memorizing the frequency of use for each key, thereby allowing a user to remember the positions of the keys (Refer to Patent Application No. 10-2009-0015523). However, this method has its limitations in that the user must remember the position of the keys on the keypad, and has a downside in that it often increases the frequency of typographical errors. In addition, the configuration of a keypad depends on the type of a terminal and the method cannot be easily applied to the use of Latin-based text or special characters, excluding Korean Hangul.

Therefore the inventors have developed a method of displaying a keypad in such a way that input and output windows are available as wide as possible and at the same time the confusion resulting from the overlapping of the windows is reduced, without requiring a user to memorize the position of each key.

DISCLOSURE

Technical Problem

Accordingly, the present invention has been made keeping in mind the above problems of the previous methods, and an object of the present invention is to provide a method of displaying a keypad for a smart device in such a way that the keypad is displayed in a transparent or translucent manner in overlapping alignment with an output window displayed on the display module of the smart device so that both the input and output windows are available over a wide area, the transparency or color of the keypad changes periodically so that the user can locate the keypad displayed briefly and therefore input text accurately without having to memorize the position of each key, and the keypad is made transparent so that the problem of the confusion resulting from the overlapping with the output window is solved.

Another object of the invention is to provide a method of displaying a keypad for a smart device in such a way that the transparency or color of the keypad changes in each of multiple sections divided based on predetermined ranges so that the reduced area obscured by the keypad due to low transparency facilitates the recognition of the output window on the screen, and the smaller number of keys displayed at any given moment allows the user to remember the position of the keys and input text more easily, thereby improving the visual aesthetics of the screen.

A further object of the invention is to provide a method of displaying a keypad for a smart device in such a way that the occurrence of a key input on the keypad lowers the transparency of the key being entered or changes the color thereof so that the increased recognition of the key allows the user to identify what is displayed on the selected key.

Technical Solution

In order to accomplish the above object(s), the present invention provides a method of displaying a keypad for a smart device comprising the steps of:

(1) setting the smart device to a keypad display mode;

(2) displaying the keypad on the display module of the smart device; and (3) changing the transparency or color of the keypad periodically, wherein the keypad is displayed in a transparent or translucent manner in overlapping alignment with an output window displayed on the display module of the smart device.

Preferably, the transparency may repetitively undergo a gradual increase from low to complete transparency and a gradual decrease in the other direction.

Preferably, the transparency or color may change independently in each of multiple sections divided based on predetermined ranges.

More preferably, the multiple sections divided based on predetermined ranges may be rows or columns of multiple keys.

Preferably, the color may repetitively undergo a gradual change from a predetermined color of the keypad to the color complementary to that displayed on the output window and gradually return to the predetermined color of the keypad.

Preferably, the occurrence of a key input on the keypad may decrease the transparency of the key being entered or change the color thereof.

Preferably, the keypad may change in size or position in response to at least one User Interface (UI) action selected from a group containing zoom-in, zoom-out, up/down/left/right scrolling and dragging.

Preferably, the transparency, color, change cycle or section range may depend on user settings.

Preferably, the display module of the smart device may contain a touch screen.

Advantageous Effects

According to a method of displaying a keypad for a smart device presented by the invention, the keypad is displayed in a transparent or translucent manner in overlapping alignment with an output window displayed on the display module of the smart device so that both the input and output windows are available over a wide area, the transparency or color of the keypad changes periodically so that the user can locate the keypad displayed briefly and therefore make accurate inputs without having to memorize the position of each key, and the keypad is made transparent so that the problem of the confusion resulting from the overlapping with an output window is solved.

According to the invention, the transparency or color of the keypad changes in each of multiple sections divided based on predetermined ranges so that the reduced area obscured by the keypad due to low transparency facilitates the recognition of the output window and the smaller number of keys displayed at any given moment allows the user to remember the position of the keys and make a key input more easily, thereby improving the visual aesthetics of the screen.

In addition, according to the invention, the occurrence of a key input on the keypad lowers the transparency of the key being entered or changes the color thereof so that the increased recognition of the key allows the user to identify what is displayed on the selected key.

DESCRIPTION OF THE REFERENCE NUMERALS IN THE DRAWINGS

10: a smart device
20: a display module
100: a keypad
200: an output window
S100: a step for setting a smart device to a keypad display mode
S200: a step for displaying a keypad on the display module of the smart device
S300: a step for periodically changing the transparency or color of the keypad.

BEST MODE

Hereinafter, preferred embodiments are described in detail with reference to the accompanying figures so that those skilled in the art to which the present invention pertains can easily practice the invention. In the detailed description of the preferred embodiments of the invention, however, detailed depictions of well known related functions and configurations may be omitted so as not to obscure the art of the present invention with superfluous detail. Also, the same or similar reference numerals are used throughout the different drawings to indicate similar functions or operations.

In addition, as used herein, the term "connection" of one portion to another includes the meaning of "indirect connection" of two portions having another element between the two, as well as "direct connection" between the two. Also, the phrase "a portion includes a component" means that the portion can further include other components, rather than exclude other components, unless otherwise described.

Figure 1:
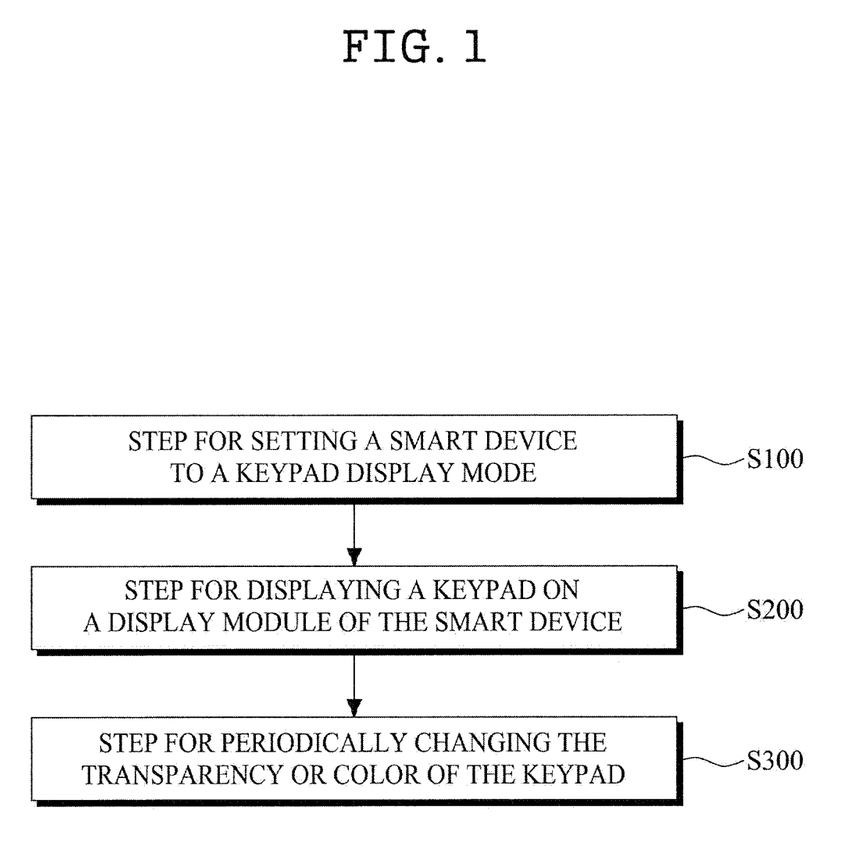
FIG. 1 is a diagram of a flow for a method of displaying a keypad for a smart device according to an embodiment of the invention.

FIG. 1 is a diagram of a flow for a method of displaying a keypad for a smart device according to an embodiment of the invention. As illustrated in FIG. 1, the method of displaying a keypad for a smart device according to an embodiment of the invention may comprise the steps of setting the smart device to a keypad display mode (S100), displaying the keypad on the display module of the smart device (S200) and changing the transparency or color of the keypad periodically (S300). In addition, the keypad may be displayed in a transparent or translucent manner in overlapping alignment with an output window displayed on the display module of the smart device.

The step S100 is for setting the smart device to a keypad display mode, wherein the keypad is displayed on the display module when a user intends to input text on the smart device. The mode can be set not only by the user's action, but also automatically depending on the execution state of a program on the smart device, as in the case where the keypad display mode is automatically selected when a program requiring an input is executed.

In the invention, a smart device refers to a device whose functions are not limited and can mostly be modified and extended by use of application programs, as represented by a smartphone, which allows downloading and installation of applications. However, the invention is not limited to smart devices and can be applied to all kinds of electronic devices with a keypad for allowing text inputs and a display module for displaying various output images. However, since the method can be easily implemented through an application program, it is recommended that the method is used for electronic devices (smart devices) allowing downloading and installation of application programs.

Figure 2:
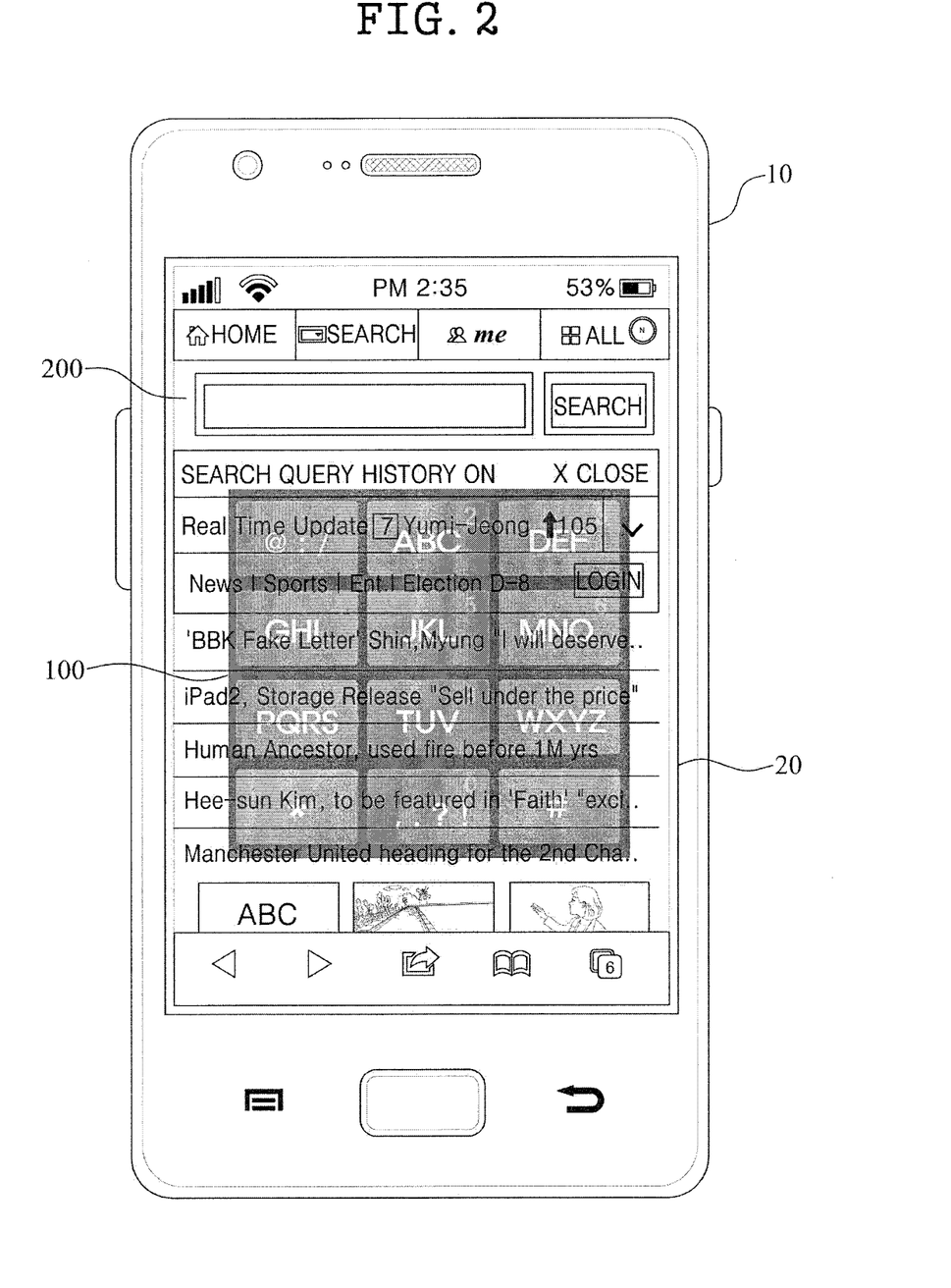
FIG. 2 is a diagram of displaying a keypad in a method of displaying a keypad for a smart device according to an embodiment of the invention.

The step S200 for displaying a keypad on the display module of the smart device can be carried out according to the setting in the step S100. FIG. 2 is a diagram of displaying a keypad in a method of displaying a keypad for a smart device according to an embodiment of the invention. As illustrated in FIG. 2, in the method of displaying a keypad for a smart device according to an embodiment of the invention, the keypad 100 may be displayed in a transparent or translucent manner in overlapping alignment with an output window 200 displayed on the display module 20 of the smart device 10. The display module 20 refers to a display unit that visually outputs data on a screen and may contain a touch screen for some embodiments.

In step S300, the transparency or color of the displayed keypad 100 may change periodically. That is, the transparency or color of the keypad 100 displayed in overlapping alignment with an output window 200 displayed on the display module 20 may change over time. This setup can solve a problem caused by the confusion between content displayed on the output window 200 and that displayed on the keypad 100.

Figure 3:
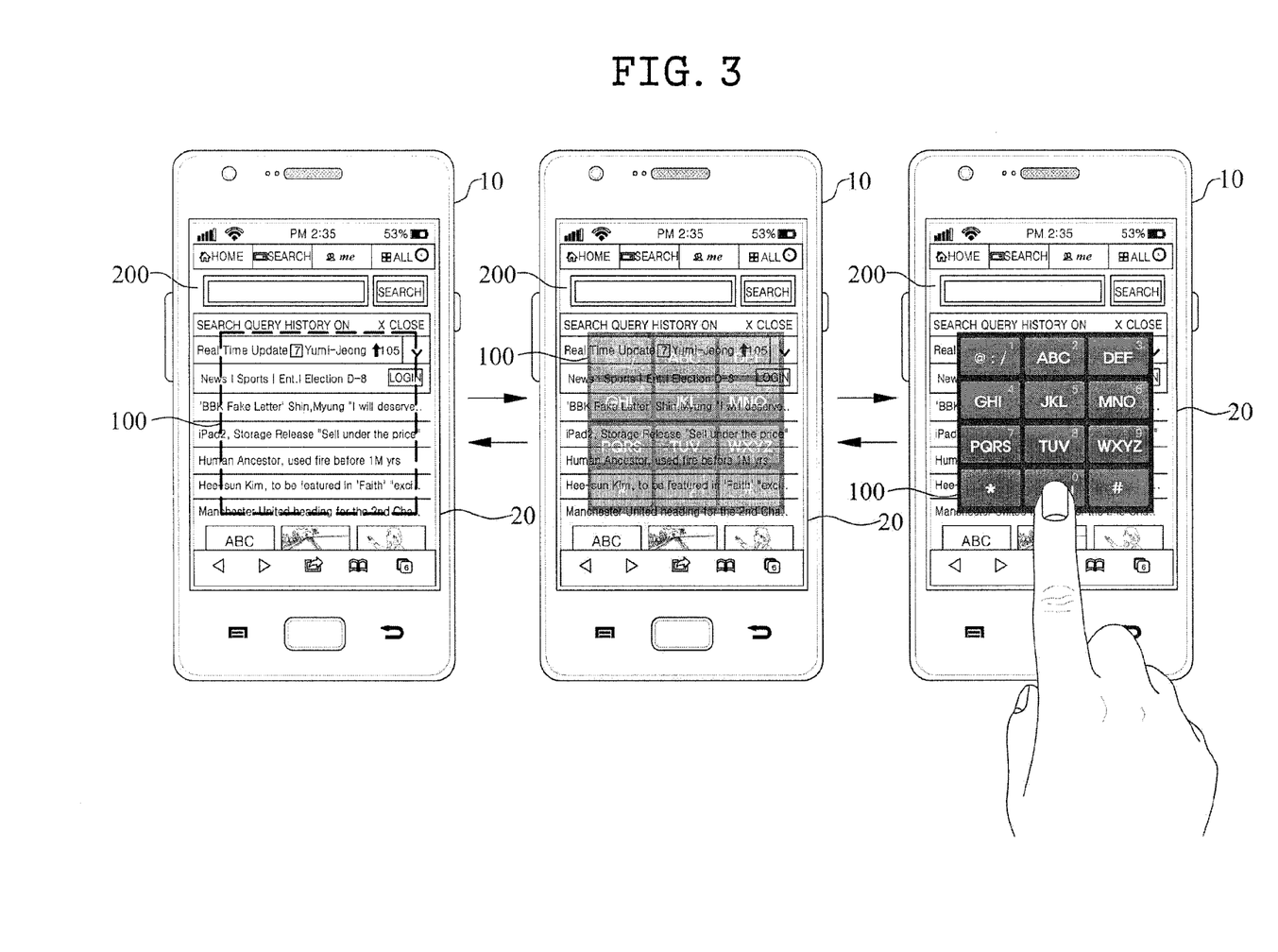
FIG. 3 is a diagram of illustrating a periodic change of the transparency of a keypad in a method of displaying a keypad for a smart device according to an embodiment of the invention.

FIG. 3 is a diagram of illustrating a periodic change of the transparency of a keypad in a method of displaying a keypad for a smart device according to an embodiment of the invention. As illustrated in FIG. 3, the method of displaying a keypad for a smart device according to an embodiment of the invention changes the transparency of the keypad 100 displayed on the display module 20 over time, thereby causing the content displayed on the output window 200 and that displayed on the keypad 100 to alternately stand out. In some embodiments, the transparency of the keypad 100 may repetitively undergo a gradual increase from a low to complete transparency and a gradual decrease in the other direction. The user may enter desired texts by memorizing the content displayed on the keypad 100 when the transparency is low, and may recognize the content displayed on the output window 200 without confusion when the keypad 100 becomes transparent.

Figure 4:
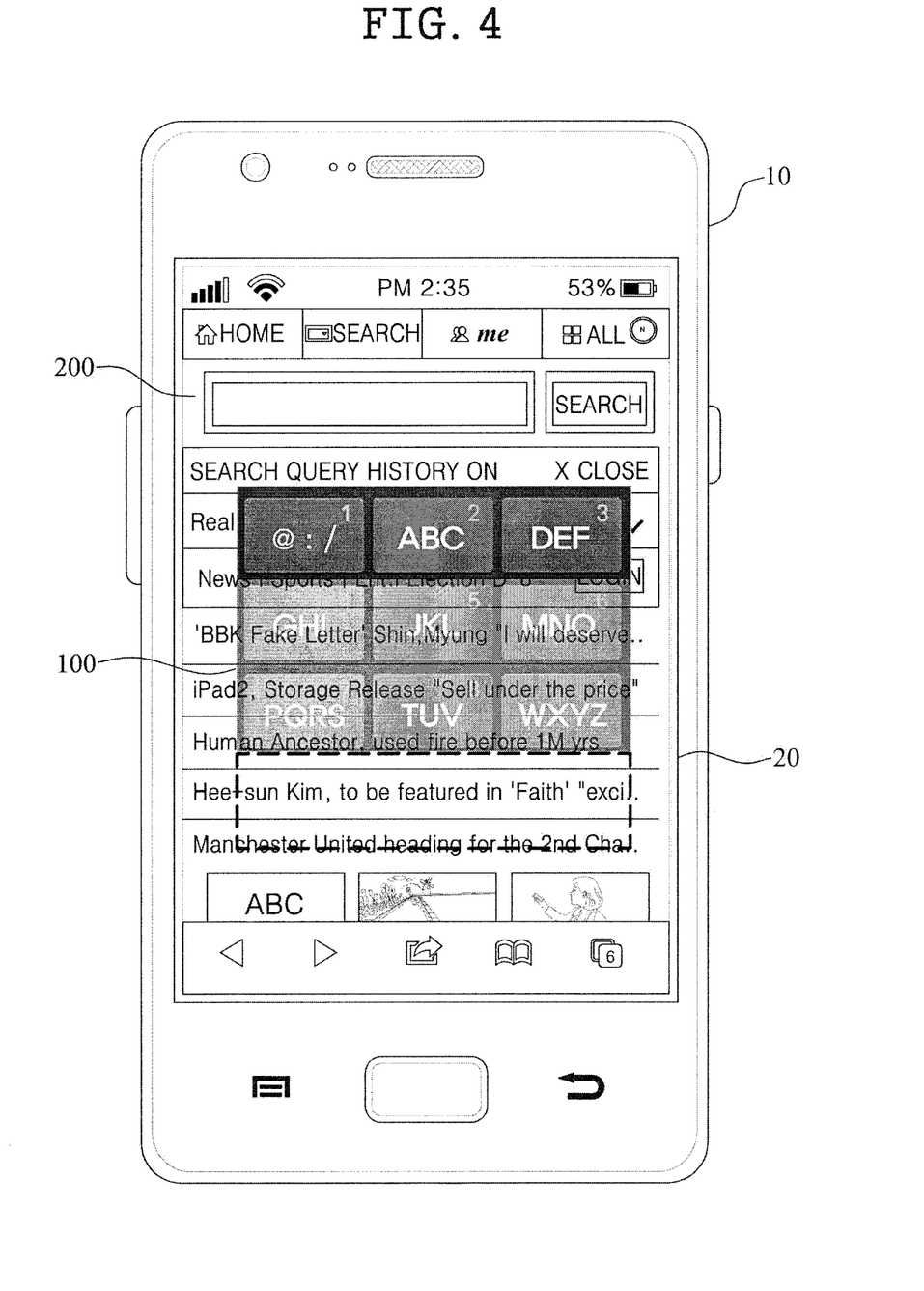
FIG. 4 is a diagram of illustrating how the transparency of a keypad changes independently in each section within predetermined ranges in a method of displaying a keypad for a smart device according to an embodiment of the invention.

FIG. 4 is a diagram of illustrating how the transparency of a keypad changes independently in each section within predetermined ranges in a method of displaying a keypad for a smart device according to an embodiment of the invention. As illustrated in FIG. 4, in the method of displaying a keypad for a smart device according to an embodiment of the invention, the transparency or color of the keypad 100 may change independently in each of multiple sections divided based on predetermined ranges. If the transparency or color of the keypad 100 changes as a whole, too much of the output window 200 may be obscured when the keypad 100 is fully displayed (the transparency of the keypad 100 is low) and the user may experience difficulties inputting text when the keypad 100 is not displayed at all (the transparency of the keypad 100 is high). This problem may be solved by dividing the screen into sections and changing the transparency or color of the keypad 100 in sequence in each section. In some embodiments, multiple sections divided based on predetermined ranges may be rows or columns of multiple keys. As illustrated in FIG. 4, the transparency may be lowest in the first row and gradually increase towards the bottom row, and in a certain period of time, on the contrary, the transparency may be highest in the first row and lowest in the bottom row.

Figure 5:
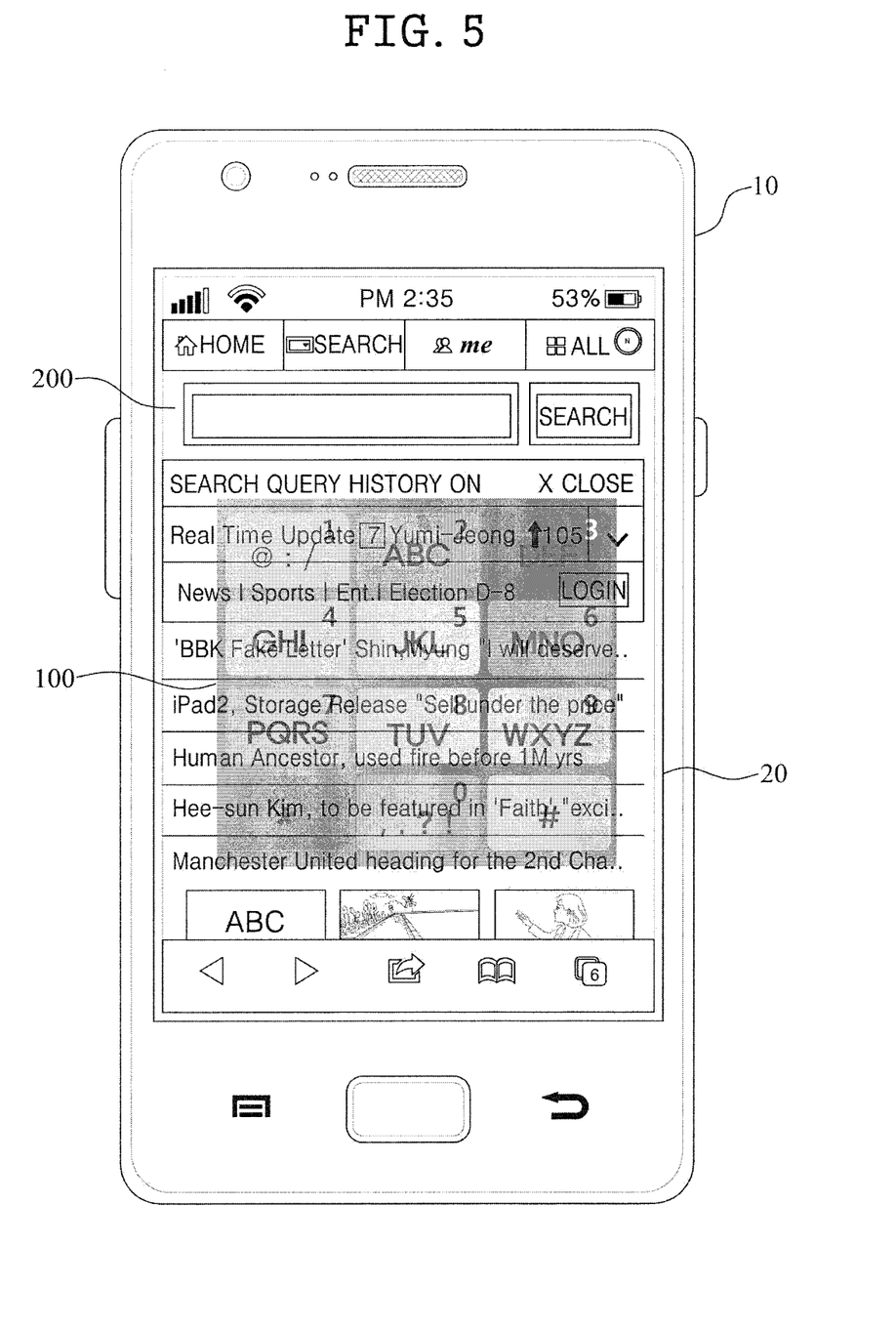
FIG. 5 is a diagram of illustrating how the color of a keypad changes independently in each section within predetermined ranges in a method of displaying a keypad for a smart device according to an embodiment of the invention.

FIG. 5 is a diagram of illustrating how the color of a keypad changes independently in each section within predetermined ranges in a method of displaying a keypad for a smart device according to an embodiment of the invention. As illustrated in FIG. 5, in the method of displaying a keypad for a smart device according to an embodiment of the invention, the color of the keypad 100 may change so that the colors of the keys are symmetric around a diagonal line in the middle. Also, the color of the keypad 100 may gradually change from a predetermined color of the keypad 100 to the color complementary to that displayed on the output window and return to the predetermined color of the keypad 100. A color change of the keypad 100 to the color complementary to that displayed on the output window corresponds to a decrease in the transparency of the keypad 100, thereby increasing the visibility of the content displayed on the keypad 100. Such a color change according to specific rules allows the user to input text more easily, reduces the confusion between the content on the output window 200 and that displayed on the keypad 100, and provides an aesthetically pleasing display image.

Figure 6:
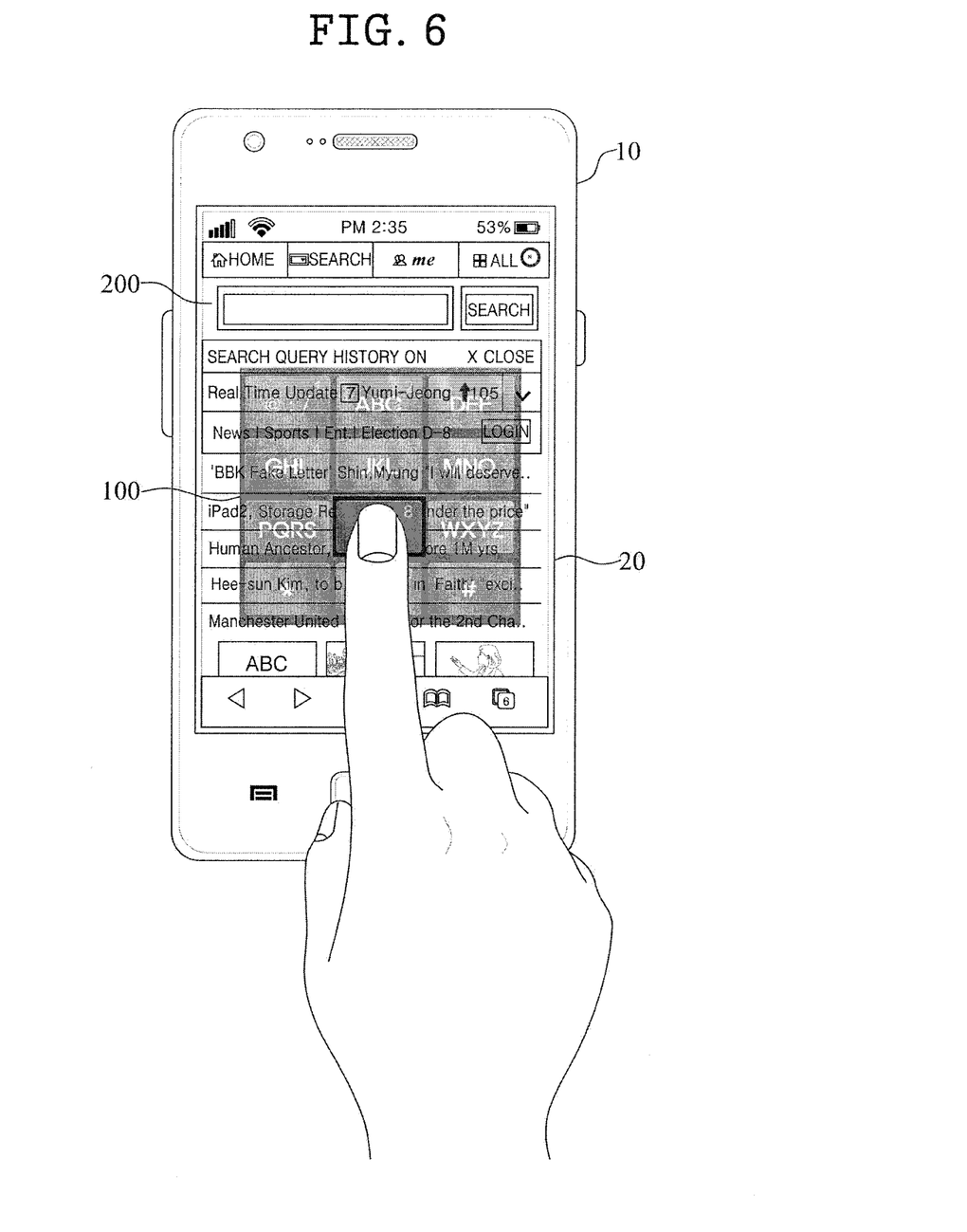
FIG. 6 is a diagram of illustrating a decrease in the transparency of an entered key in a method of displaying a keypad for a smart device according to an embodiment of the invention.

FIG. 6 is a diagram of illustrating a decrease in the transparency of an entered key in a method of displaying a keypad for a smart device according to an embodiment of the invention. As illustrated in FIG. 6, the method of displaying a keypad for a smart device according to an embodiment of the invention may be implemented so that the occurrence of a key input using the keypad 100 lowers the transparency of a key being entered or changes the color thereof. This setup allows the user to identify what is displayed on the selected key. For a specific example, the moment the user touches a key on the keypad 100 displayed on the touch screen, the transparency of the touched key decreases so that the content displayed on the key is displayed clearly and the user can check if he/she has touched the right key.

Figure 7:
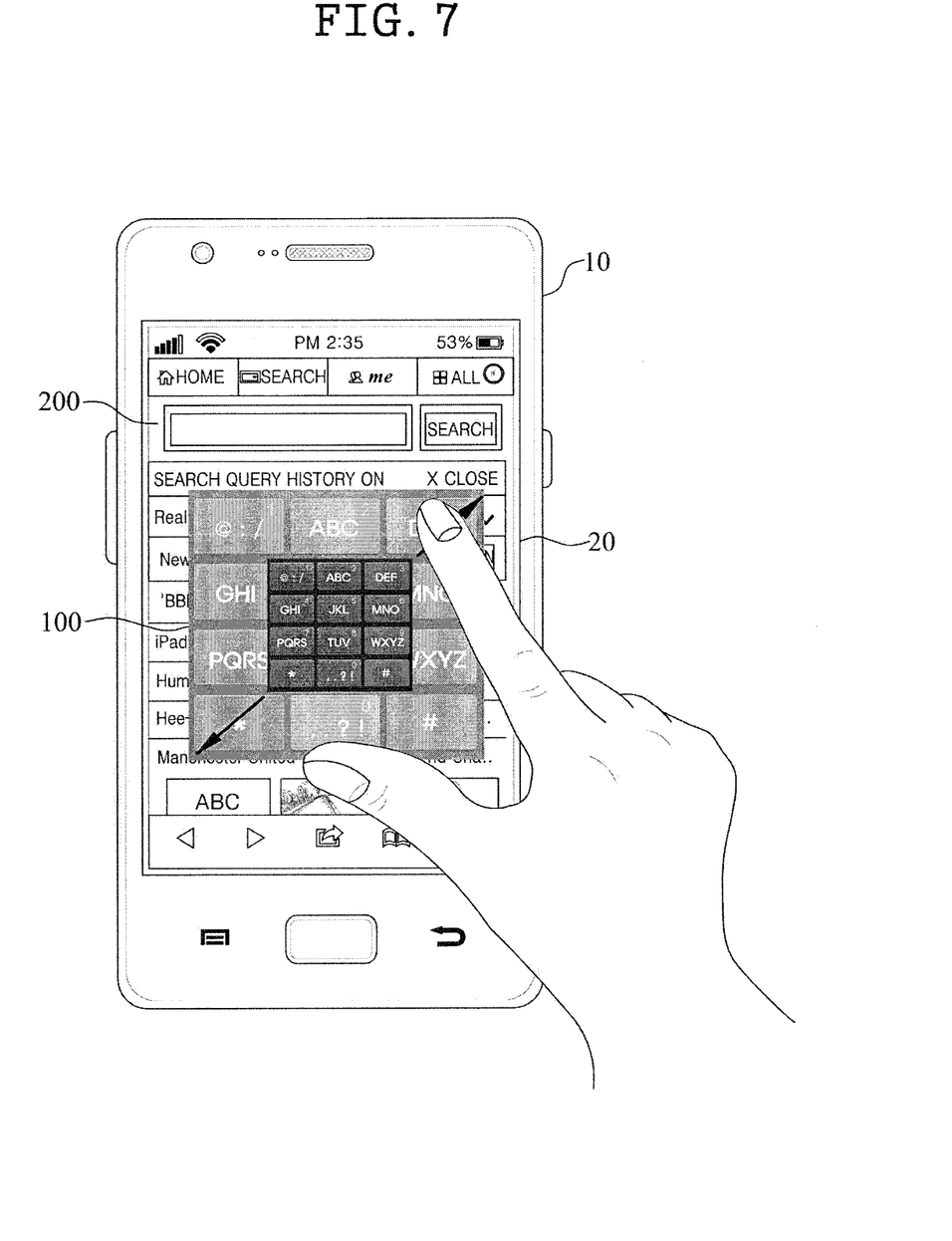
FIG. 7 is a diagram of illustrating a change in the size of a keypad in response to a UI action in a method of displaying a keypad for a smart device according to an embodiment of the invention.

Meanwhile, the keypad 100 may change in size or position in response to at least one UI action selected from a group containing zoom-in, zoom-out, up/down/left/right scrolling and dragging. FIG. 7 is a diagram of illustrating a change in the size of a keypad in response to a UI action in a method of displaying a keypad for a smart device according to an embodiment of the invention. As illustrated in FIG. 7, the user can enlarge or reduce the whole size of the keypad 100 with his/her UI action. Also, in some embodiments, the transparency, color, change cycle or section range of the keypad 100 may depend on user settings.

The present invention described above may be modified and altered in various ways by those skilled in the art to which the invention pertains, and the scope of the technical spirit according to the invention will be defined by the appended claims.

The invention claimed is:

1. A method of displaying a keypad for a mobile device, comprising the steps of:
   (1) setting the mobile device to a keypad display mode;
   (2) displaying the keypad on a display module of the mobile device; and
   (3) periodically changing a translucency and a color of each section of the keypad to have a different translucency and color,
   wherein each section of the keypad is displayed in a different translucency in overlapping alignment with an output window displayed on the display module of the mobile device,
   wherein the translucency of each section repetitively undergoes a gradual increase from low to complete translucency and a gradual decrease from complete to low translucency,
   wherein a key input on the keypad lowers the translucency of a key being entered or changes the color thereof, and
   wherein the sections of the keypad are divided based on rows or columns of the keypad.

2. The method of claim 1, wherein the color repetitively undergoes a gradual change from a predetermined color of the keypad to a color complementary to a color displayed the output window and returns to the predetermined color of the keypad.

3. The method of claim 1, wherein the keypad changes in size or display position in response to at least one User Interface action selected from a group containing zoom-in, zoom-out, up/down/left/right scrolling and dragging.

4. The method of claim 1, wherein the translucency, color, change cycle or section range depends on user settings.

5. The method of claim 1, wherein the display module of the mobile device contains a touch screen.

6. A mobile device for displaying a keypad, the mobile device comprising:
   a processor configured to execute one or more modules;
   a memory configured to store the one or more modules;
   a display;

wherein the one or more modules comprises a keypad display module configured to:
set the mobile device to a keypad display mode,
output each section of the keypad in a different translucency in overlapping alignment with an output window via the display, and
periodically change the translucency and color of each section of the keypad to have a different translucency and color,
wherein keypad display module causes the color to repetitively undergo a gradual change from a predetermined color of the keypad to a color complementary to a color displayed the output window and return to the predetermined color of the keypad,
wherein the keypad display module, in response to a key input on the keypad, causes the keypad to lower the translucency of a key being entered or change the color thereof, and
wherein the sections of the keypad are divided based on rows or columns of the keypad.

7. The mobile device of claim 6, wherein the keypad display module causes the translucency to repetitively undergo a gradual increase from low to complete translucency and a gradual decrease from complete to low translucency.

8. The mobile device of claim 6, wherein the keypad display module causes the keypad to change in size or display position in response to at least one User Interface action selected from a group containing zoom-in, zoom-out, up/down/left/right scrolling and dragging.

9. The mobile device of claim 6, wherein the translucency, color, change cycle or section range depends on user settings.

10. The mobile device of claim 6, wherein the display comprises a touch screen.

* * * * *